United States Patent
Lanser et al.

(10) Patent No.: US 6,910,725 B1
(45) Date of Patent: Jun. 28, 2005

(54) SLIDING VISOR

(75) Inventors: Michael L. Lanser, Holland, MI (US); Jonathan B. Lubbers, Byron Center, MI (US); David L. Hiemstra, Hudsonville, MI (US)

(73) Assignee: Innotec Corporation, Zeeland, MI (US)

( * ) Notice: Subject to any disclaimer, the term of this patent is extended or adjusted under 35 U.S.C. 154(b) by 0 days.

(21) Appl. No.: 10/776,865

(22) Filed: Feb. 11, 2004

(51) Int. Cl.[7] ............................................. B60J 3/02
(52) U.S. Cl. ............................. 296/97.11; 296/97.12
(58) Field of Search .................. 296/97.1, 97.8, 296/97.11, 97.12, 97.13, 97.9

(56) References Cited

U.S. PATENT DOCUMENTS

| | | |
|---|---|---|
| 2,279,648 A | 4/1942 | Westrope |
| 2,340,015 A | 1/1944 | Felcher et al. |
| 4,417,761 A | 11/1983 | Cziptschirsch et al. |
| 4,469,367 A | 9/1984 | Kuttler et al. |
| 4,810,023 A | 3/1989 | Kawada |
| 4,925,233 A | 5/1990 | Clark |
| 5,004,289 A | 4/1991 | Lanser et al. |
| 5,044,687 A | 9/1991 | Abu-Shumays et al. |
| 5,251,949 A | 10/1993 | Miller et al. |
| 5,328,227 A | 7/1994 | Pax, Jr. et al. |
| 5,338,083 A | 8/1994 | Gute |
| 5,409,285 A | 4/1995 | Snyder et al. |
| 5,538,310 A | 7/1996 | Frankhouse et al. |
| 5,653,490 A * | 8/1997 | Fink et al. ................ 296/97.11 |
| 5,765,899 A * | 6/1998 | Watjer et al. ............ 296/97.11 |
| 5,810,421 A | 9/1998 | Kalkman et al. |
| 5,967,587 A | 10/1999 | Collet et al. |
| 5,967,588 A | 10/1999 | Collet et al. |
| 6,010,174 A | 1/2000 | Murdock et al. |
| H1834 H | 2/2000 | Wilson et al. |
| 6,042,172 A * | 3/2000 | Murdock ................. 296/97.12 |
| 6,174,019 B1 | 1/2001 | Collet et al. |
| 6,231,105 B1 | 5/2001 | Viertel |
| 6,254,168 B1 | 7/2001 | Crotty, III |
| 6,286,887 B1 | 9/2001 | Hashmi |
| 6,402,221 B1 | 6/2002 | Ogunjobi |
| 6,692,059 B1 * | 2/2004 | Mills ......................... 296/97.1 |

FOREIGN PATENT DOCUMENTS

JP           405286362 A  * 11/1993  .............. 296/97.11

* cited by examiner

*Primary Examiner*—Jason Morrow
(74) *Attorney, Agent, or Firm*—Price, Heneveld, Cooper, DeWitt & Litton, LLP

(57) ABSTRACT

A visor for vehicles includes an elbow member having an elongated portion, and a body member having an elongated slot defining a sidewall. The elongated slot extends generally parallel to the elongated portion of the elbow member. The body member is pivotably mounted to the elbow member for rotation about the elongated portion. A torque control member rotatably engages the elbow member, and has at least one finger received in the elongated slot. The finger is resiliently biased into engagement with the sidewall of the elongated slot, and frictionally engages the sidewall to provide controlled sliding movement of the body member relative to the elbow member.

23 Claims, 4 Drawing Sheets

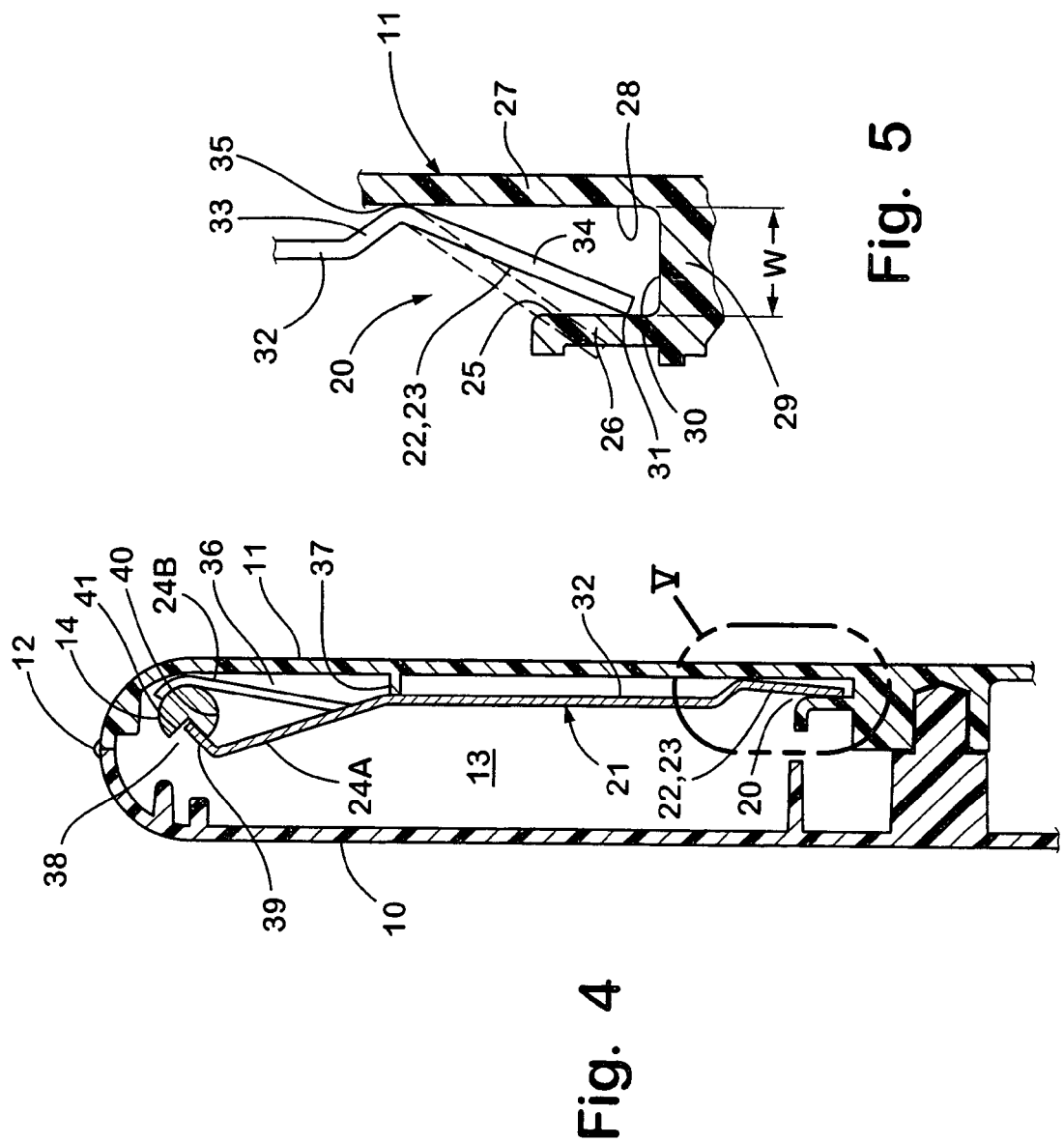

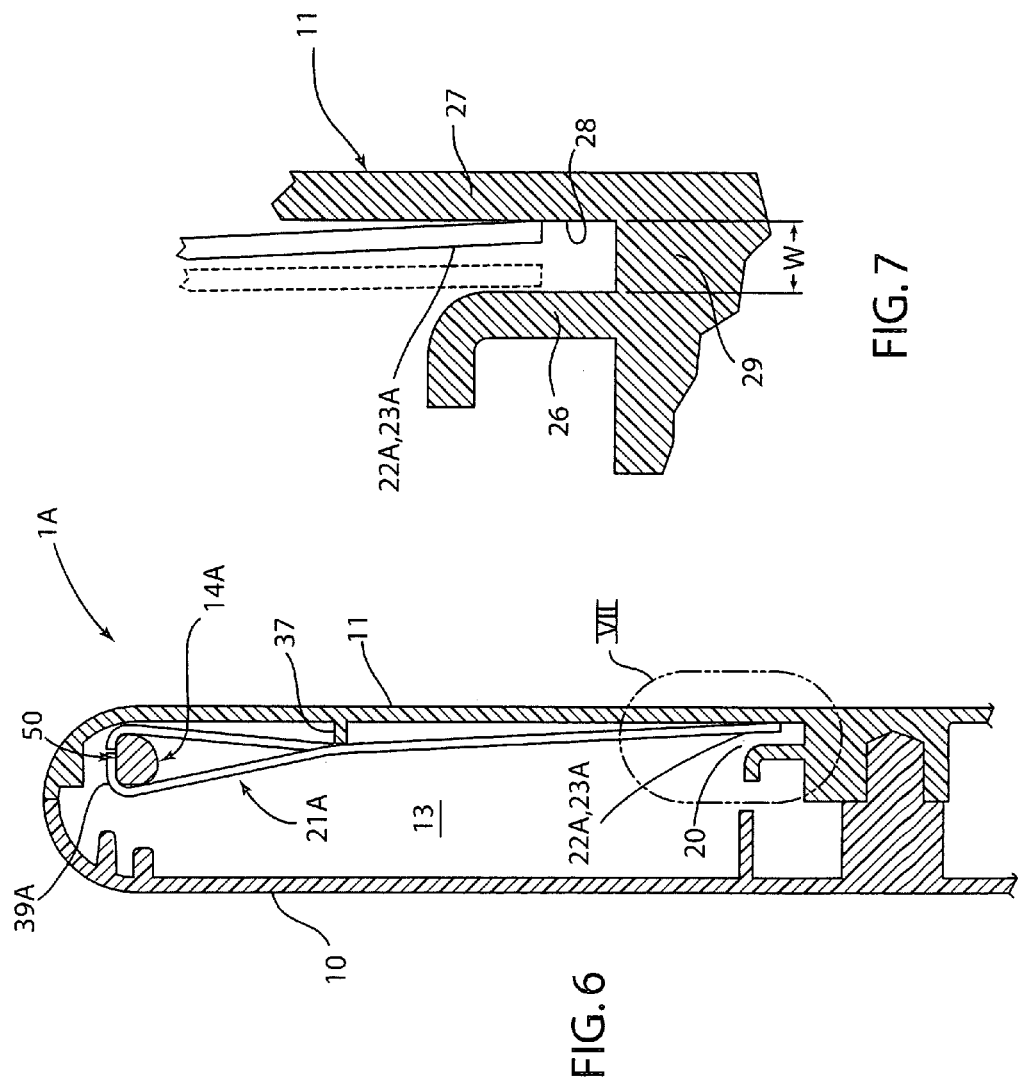

SLIDING VISOR

BACKGROUND OF THE INVENTION

Various sun visors have been developed for cars, trucks, and other such vehicles. Such sun visors may provide front and side window protection against sunlight. Such visors are typically mounted on an elbow that rotates to selectively change position of the visor from the front or windshield position to a side position along the side window of the vehicle. Visors are typically configured to rotate about the elbow from a stored position adjacent the interior surface of the roof of the vehicle and a use position adjacent the windshield or side window of the vehicle. Visors commonly include a torque control to control pivoting of the visor about the elbow. Also, various mechanisms have been developed in an attempt to provide controlled sliding motion of the visor along the elbow. However, known sliding and torque control mechanisms are often complicated, and may require high tolerance during manufacture to provide the desired degree of sliding force of the visor.

SUMMARY OF THE INVENTION

One aspect of the present invention is a visor for vehicles including an elbow member having an elongated portion, and a body member having an elongated slot defining a sidewall. The elongated slot extends generally parallel to the elongated portion of the elbow member. The body member is pivotably mounted to the elbow member for rotation about the elongated portion. A torque control member rotatably engages the elbow member, and has at least one finger received in the elongated slot. The finger is resiliently biased into engagement with the sidewall of the elongated slot, and frictionally engages the sidewall to provide controlled sliding movement of the body member relative to the elbow member.

Another aspect of the present invention is a visor for vehicles including an elbow member having an elongated portion, and a body member having a slot. The visor also includes a torque control member having at least a portion thereof received in the slot and frictionally engaging the slot to provide controlled sliding movement of the body member along the elbow member.

Yet another aspect of the present invention is a method of fabricating a sliding visor including providing an elbow member having an elongated portion. A core member having an elongated slot is also provided. A torque control member having at least one extension is provided. The extension is positioned in the elongated slot, and biased into engagement with the elongated slot to frictionally engage the sidewall to provide controlled sliding movement of the core member relative to the elbow member.

These and other features, advantages, and objects of the present invention will be further understood and appreciated by those skilled in the art by reference to the following specification, claims, and appended drawings.

BRIEF DESCRIPTION OF THE DRAWINGS

FIG. 4 is a fragmentary cross-sectional view of the visor of FIG. 3 showing the engagement of the torque control with the slot and the elbow;

FIG. 5 is an enlarged view illustrating the engagement of the torque control in the slot;

FIG. 6 is a fragmentary cross-sectional view of a visor according to another aspect of the present invention; and FIG. 7 is an enlarged view of a portion of the visor core of FIG. 6.

DETAILED DESCRIPTION OF PREFERRED EMBODIMENT

Figure 1:
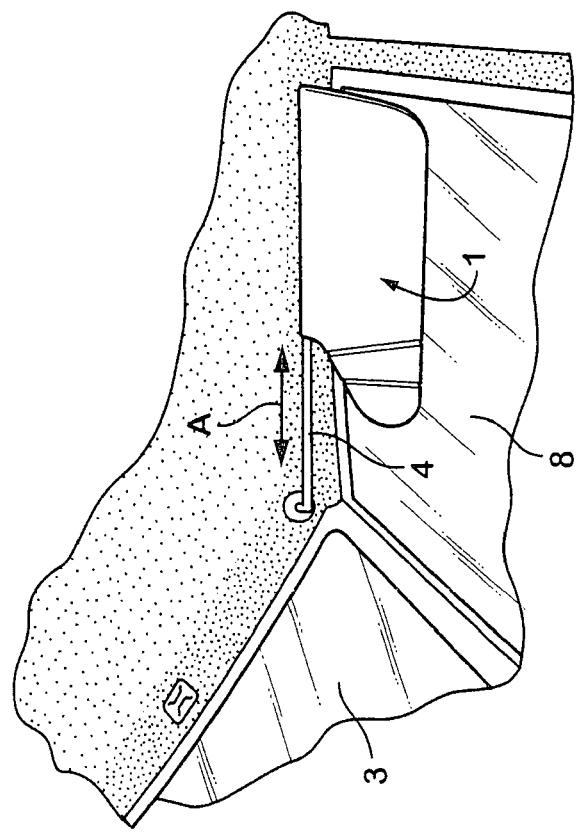
FIG. 1 is a partially fragmentary perspective view of a visor according to one aspect of the present invention mounted in the interior of a vehicle with the visor in the stored position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
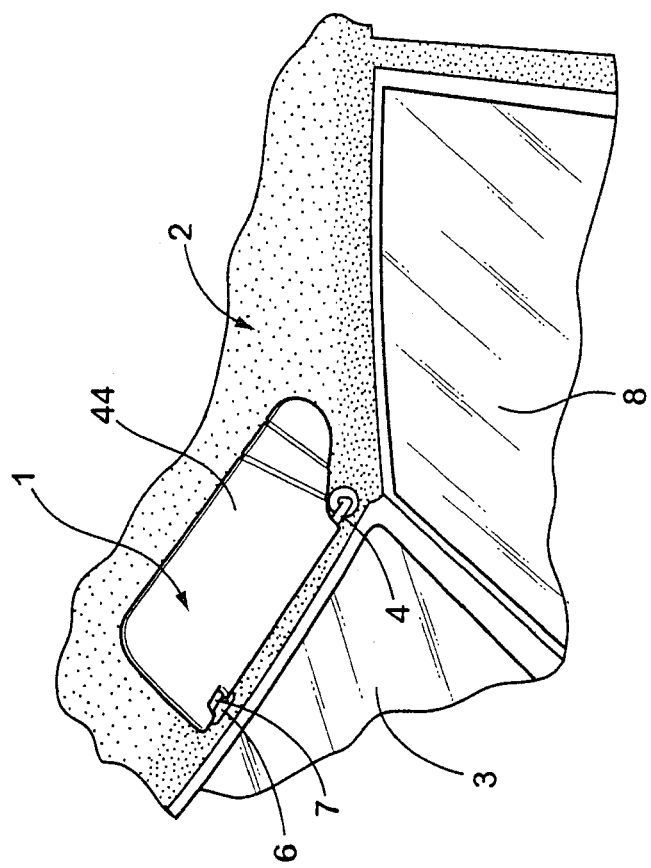
FIG. 2 is a partially fragmentary perspective view of a visor according to one aspect of the present invention mounted in the interior of a vehicle with the visor in a position adjacent a side window of the vehicle.

With reference FIG. 1, the visor 1 of the present invention includes an elbow 4 that mounts the visor 1 to the interior surface 2 of the vehicle roof. A conventional connector 6 mounted on the surface 2 is releasably connected to an exposed portion 7 of elbow 4 to retain the visor 1 in the stored position adjacent the windshield 3 as illustrated in FIG. 1. The visor 1 can be rotated downwardly to a position adjacent the front windshield 3, and can also be rotated to a position wherein the visor 1 is adjacent the side window 8 of the vehicle as illustrated in FIG. 2. The visor 1 can be shifted in the direction indicated by the arrow "A" along the elbow 4. Visor 1 preferably includes a cover 44 including a layer of foam or other padding, and a cloth, leather, vinyl or other outer surface providing a pleasing appearance.

Figure 3:
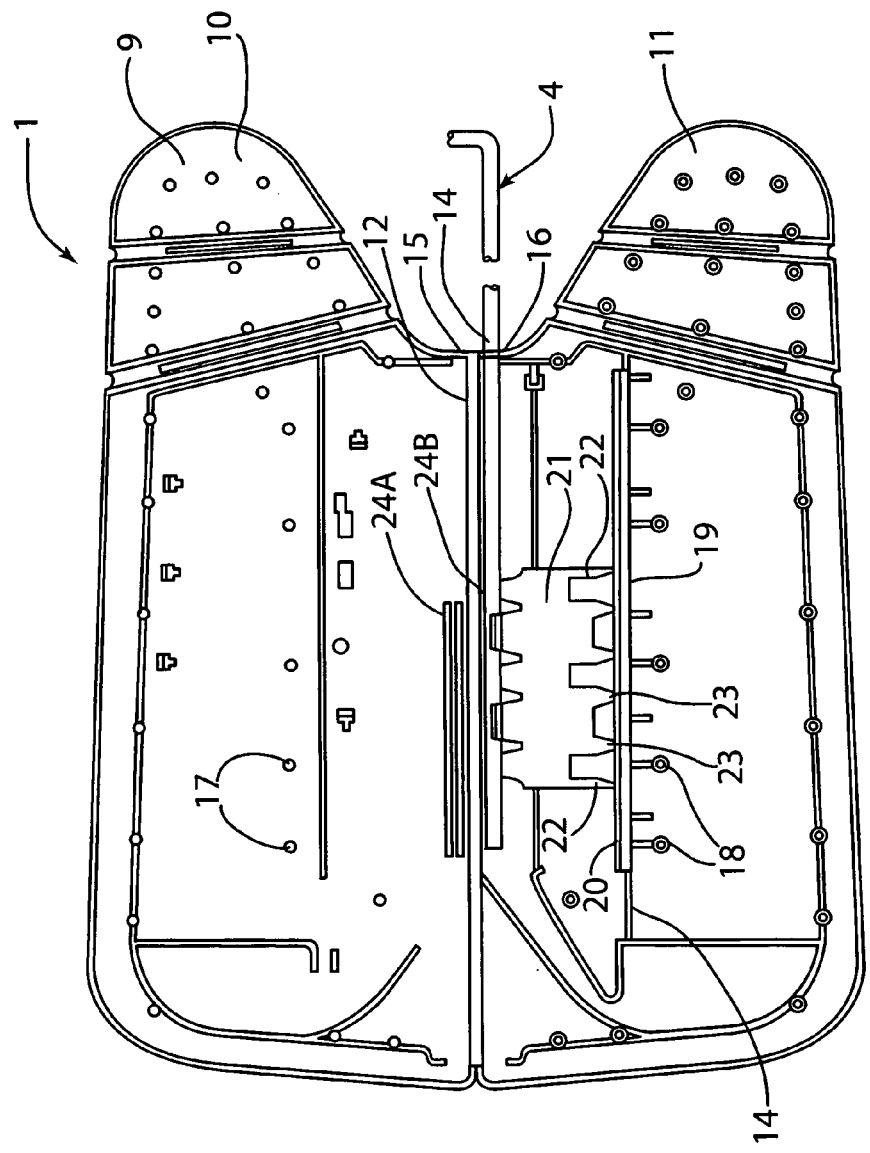
FIG. 3 is a partially fragmentary view illustrating the visor core in an "unfolded" configuration with the torque control engaging the elongated slot in the core and the elbow member.

With further reference to FIG. 3, the visor 1 includes a core or body member 9 having first and second halves 10 and 11 that are pivotally interconnected at a living hinge 12. The core 9 may be molded of a polymer material, and the first and second halves 10 and 11 are generally thin shells that form a cavity 13 when folded together (see also FIG. 4). Half 10 includes a plurality of extensions or bosses 17 that are configured to be received within openings 18 in second half 11. The bosses 17 have a diameter that is somewhat greater than the openings 18. During assembly, the bosses are forced into the openings 18, and the friction caused by the engagement causes the bosses 17 and/or openings 18 to melt together, thereby securely interconnecting the halves 10 and 11. Alternate known materials such as gluing or the like may be utilized to interconnect the visor halves 10 and 11. Elbow 4 includes an elongated portion 14 that extends through cutout portions 15 and 16. A central rib 19 extends generally parallel to the living hinge 12 and elongated portion 14 of elbow 4. An elongated slot 20 is formed along the central rib 19. It will be readily apparent that alternate core constructions could be utilized. For example, the visor core could be constructed of cardboard, and a polymer insert could be utilized to form the slot 20.

A torque control spring 21 is fabricated from a relatively thin sheet of flexible material such as steel, or other suitable material. Torque control 21 includes a plurality of fingers 22 and 23 that are received within the slot 20. Torque control 21 also includes a plurality of fingers 24 that engage the elongated portion 14 of elbow 4 to provide torque control for rotation of the visor body about the elongated portion 14 of elbow 4.

With further reference to FIGS. 4 and 5, when assembled the fingers 22 and 23 of torque control 21 are received in slot 20 to frictionally engage a side surface 25 of slot 20 defined by a wall or flange 26 that extends generally parallel to sidewall 27 of the second half 11 of the core or body portion 9. The sidewall 27 defines a sidewall surface 28 that is generally parallel to the side surface 25, and a base wall 29 extends transversely from the wall 27, and defines a base wall surface 30. In a preferred embodiment, torque control 21 includes a generally flat central portion 32, and fingers 22 and 23. Fingers 22 and 23 include an intermediate portion 33 that extends towards the wall 27, and an end portion 34 that extends at an angle away from the wall 27 and into the side surface 25 formed by wall 26. An end portion 31 of the fingers 22 and 23 contacts the sidewall 25, and the edge 35 contacts the sidewall surface 28. The torque control 21 is formed of a flexible material, and the fingers 22 and 23 are initially formed to have a shape corresponding to the dash line illustrated in FIG. 5 when in the relaxed state prior to assembly. During assembly, the fingers 22 and 23 are inserted into the slot 20 when the halves 10 and 11 are in the open position illustrated in FIG. 3, and the upper portion 36 of torque control 21 is rotated toward the half 11 and into contact with a support such as a rib 37. The halves 10 and 11 are then folded about the living hinge 12, and the bosses 17 are pushed into the openings 18 as described above. Although the fingers 22 and 23 are shown as having an intermediate edge portion 35 contacting the sidewall surface 28 of the shell 11, and an end portion 31 contacting the sidewall surface 25, the fingers 22 and 23 could be configured to extend in the opposite direction with end 31 contacting sidewall surface 28. Also, some fingers could be configured to extend into contact with surface 25, while other fingers would extend and contact the surface 28. Also, caps made of a lower friction material such as polymer felt, or the like may be provided on the tips of fingers 22 and 23 to reduce the friction and resulting sliding force.

The amount of frictional engagement between the torque control 21 and the slot 20 and shell wall 27 can be controlled by controlling the amount the fingers 22 and 23 bend when assembled. The thickness of the fingers and/or the modules of elasticity of the material of the fingers may also be varied as required for a particular application. This controls the amount of force with which the torque control 21 engages the core 9 to thereby control the amount of force required to slide the core 9 along the elongated portion 14 of elbow 4. Significantly, dimensional variations in the width "W" have a relatively small impact on the sliding force required to move torque control 21, because the amount of force generated by the fingers 22 and 23 does not vary significantly with changes in the dimension W. Thus, the tolerances required to fabricate the core 9 are not as critical as with other known arrangements. Also, the dimension W of slot 20 may vary along the length of the slot 20 without causing undue changes in the force required to slide the core 9 relative to the elongated rod 14 of elbow 4. Still further, dimensional variations such as non-planar surfaces 25 and 28 also have a relatively small impact on the sliding force. Also, the present invention eliminates numerous individual parts and the like found in prior slide mechanisms, thereby reducing the complexity and associated cost for fabrication of the visor 1.

Torque control 21 also includes a plurality of fingers 24A having ends that engage flats or indentations 38 in elongated portion 14 of rod 4, and a plurality of fingers 24B having end portions 4 that engage the circular outer surface portion 41 of elongated portion 14 of rod 4. The fingers 24A and 24B thereby provide torque control for rotation of the visor body 9 about the elbow 4 in a conventional manner.

With further reference to FIGS. 6 and 7, a visor core assembly 1A according to another aspect of the present invention includes a torque control 21A that engages an elongated rod 14A. Torque control 21A includes an end 39A that engages a flat 50 on elongated rod 14A to provide a detent when the visor is rotated about the rod 14A. The visor core halves 10 and 11 of visor 1A have substantially the same construction as discussed in more detail above in connection with FIGS. 4 and 5, and include a slot 20 as also described in detail above. However, the fingers 22A and 23A of torque control 21A do not include an intermediate portion 33. Rather, fingers 22A and 23A are substantially straight, as shown in FIGS. 6 and 7. Because the fingers 22A and 23A only contact the sidewall 28 of second half of the visor core 11, the fingers 22A and 23A generate substantially less friction than the arrangement illustrated in FIGS. 4 and 5. Accordingly, the torque control 21A may be utilized in applications wherein a lower sliding force is required.

The visor 1 of the present invention substantially reduces the number of parts required to provide a sliding visor. Also, the sliding engagement of the fingers in the slot provide for a relatively constant force despite variations in the dimensions of the slot, other core portions, or the torque control. Still further, the frictional engagement of the fingers with the slot eliminates the play or "slop" that otherwise can occur during initial sliding movement of the visor in prior known arrangements.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A visor for vehicles, comprising:
   an elbow member having an elongated portion;
   a body member having an elongated slot defining a sidewall and extending generally parallel to the elongated portion of the elbow member;
   the body member being pivotably mounted to the elbow member for rotation about the elongated portion;
   a torque control member rotatably engaging the elbow member and having at least one finger received in the elongated slot, the finger being resiliently biased into engagement with the sidewall of the elongated slot and frictionally engaging the sidewall to provide controlled sliding movement of the body member relative to the elbow member.

2. The visor of claim 1, wherein:
   the elongated portion of the elbow member is generally straight.

3. The visor of claim 2, wherein:
   the elongated portion includes at least one indentation in the surface thereof; and wherein:

the torque control member includes at least one finger resiliently engaging the indentation to provide a detent to retain the body member in a fixed rotational position relative to the elongated portion of the elbow member.

4. The visor of claim 1, wherein:
the torque control member includes a plurality of fingers resiliently biased into engagement with the sidewall of the elongated slot.

5. The visor of claim 4, wherein:
the torque control member comprises a thin sheet of metal.

6. The visor of claim 1, wherein:
the body member is made of a molded polymer material.

7. The visor of claim 6, wherein:
the body member includes first and second halves connected by an integral living hinge about which the first and second halves pivot to form a cavity, the elongated slot extending generally parallel to the living hinge within the cavity.

8. The visor of claim 7, wherein:
the body member comprises a shell defining inner and outer surfaces;
the slot defines first and second sidewall surfaces and a base wall, the first sidewall surface defined by a portion of the inner surface of the shell, and wherein:
the base wall surface is defined by a base wall extending transversely from the inner surface of the shell, and the second sidewall surface is defined by a second sidewall that extends generally parallel to the shell.

9. A visor for vehicles, comprising:
an elbow member having an elongated portion defining at least one detent;
a body member having a slot;
a one piece metal torque control member rotatably engaging the detents, and having at least a portion thereof received in the slot and slidingly and frictionally engaging the slot and controlling sliding movement of the body member along the torque control member.

10. The visor of claim 9, wherein:
the torque control is made from a metal sheet having substantially uniform thickness.

11. The visor of claim 10, wherein:
the elongated portion of the elbow member is generally straight.

12. The visor of claim 11, wherein:
the elongated portion includes at least one indentation in the surface thereof forming the at least one detent; and wherein:
the torque control member includes at least one finger resiliently engaging the indentation to retain the body member in a fixed rotational position relative to the elongated portion of the elbow member.

13. The visor of claim 12, wherein:
the slot defines a sidewall; and
the torque control member includes a plurality of fingers resiliently biased into engagement with the sidewall of the slot.

14. The visor of claim 9, wherein:
the body member includes first and second halves connected by an integral living hinge about which the first and second halves pivot to form a cavity, the slot extending generally parallel to the living hinge within the cavity.

15. A method of fabricating a sliding visor, comprising:
providing an elbow member having an elongated portion;
providing a core member having an elongated slot;
providing a torque control member having at least one extension;
positioning the extension in the elongated slot;
biasing the extension into engagement with the elongated slot and frictionally engaging the sidewall to provide controlled sliding movement of the core member relative to the elbow member.

16. The method of claim 15, wherein:
the core member includes first and second halves interconnected by an integral living hinge; and including:
folding the first and second halves about the living hinge to form a cavity.

17. The method of claim 16, wherein:
the core is made of a polymer material;
the first half includes a plurality of openings;
the second half includes a plurality of extensions sized to provide an interference fit in the openings; and including:
pressing the extensions into the opening to thereby melt at least a portion of the extensions and interconnect the first and second halves.

18. The method of claim 15, including:
forming a plurality of fingers on the torque control; and:
flexing the fingers to bias the fingers into frictional engagement with the slot.

19. A visor for vehicles, comprising:
an elbow member having an elongated portion;
a body member having a slot;
one piece torque control member associated with formed from a thin sheet of material having substantially uniform thickness, wherein the torque control is rotatably mounted on the elongated portion of the elbow member, wherein at least a portion of the torque control member is received in the slot and frictionally engages the slot and controls sliding movement of the torque control member in the slot.

20. The visor of claim 19, wherein:
the engagement member comprises a torque control member controlling the amount of torque required to rotate the body member about the elbow member.

21. The visor of claim 19, wherein:
the elongated portion includes at least one indentation in the surface thereof; and wherein:
the torque control member includes at least one finger resiliently engaging the indentation to provide a detent to retain the body member in a fixed rotational position relative to the elongated portion of the elbow member.

22. The visor of claim 21, wherein:
the slot defines a sidewall; and
the torque control member includes a plurality of fingers resiliently biased into engagement with the sidewall of the slot.

23. The visor of claim 19, wherein:
the torque control is made of sheet metal.

* * * * *

UNITED STATES PATENT AND TRADEMARK OFFICE
CERTIFICATE OF CORRECTION

PATENT NO. : 6,910,725 B1
DATED : June 28, 2005
INVENTOR(S) : Michael L. Lanser et al.

It is certified that error appears in the above-identified patent and that said Letters Patent is hereby corrected as shown below:

Column 6,
Line 35, delete "associated with".

Signed and Sealed this

Sixth Day of December, 2005

JON W. DUDAS
*Director of the United States Patent and Trademark Office*